US011127508B2

(12) United States Patent
Lake et al.

(10) Patent No.: US 11,127,508 B2
(45) Date of Patent: Sep. 21, 2021

(54) NUCLEAR THERMAL PROPULSION FUEL ELEMENT PACKING DEVICE

(71) Applicant: BWXT Nuclear Energy, Inc., Lynchburg, VA (US)

(72) Inventors: Russell L. Lake, Evington, VA (US); James B. Inman, Forest, VA (US); Roger D. Ridgeway, Rustburg, VA (US)

(73) Assignee: BWXT Nuclear Energy, Inc., Lynchburg, VA (US)

(*) Notice: Subject to any disclaimer, the term of this patent is extended or adjusted under 35 U.S.C. 154(b) by 100 days.

(21) Appl. No.: 16/594,530

(22) Filed: Oct. 7, 2019

(65) Prior Publication Data
US 2020/0111585 A1    Apr. 9, 2020

Related U.S. Application Data

(60) Provisional application No. 62/742,809, filed on Oct. 8, 2018.

(51) Int. Cl.
*G21C 21/04* (2006.01)
*G21C 21/02* (2006.01)
*G21C 21/00* (2006.01)

(52) U.S. Cl.
CPC ............ *G21C 21/04* (2013.01); *G21C 21/00* (2013.01); *G21C 21/02* (2013.01); *Y02E 30/30* (2013.01)

(58) Field of Classification Search
CPC ........ G21C 3/045; G21C 3/047; G21C 3/048; G21C 3/58; G21C 3/60; G21C 3/62;
(Continued)

(56) References Cited

U.S. PATENT DOCUMENTS 3,253,738 A * 5/1966 Bromley ............... G21C 19/202
                                                     221/200
3,261,378 A * 7/1966 Ayer ....................... G21C 21/04
                                                      141/12
(Continued)

FOREIGN PATENT DOCUMENTS

GB          1300681 A      12/1972
WO      2019164617 A2       8/2019

OTHER PUBLICATIONS

International Search Report and Written Opinion, PCT/US19/55186, dated Jun. 2, 2020, 7 pages.

*Primary Examiner* — Timothy P. Kelly
*Assistant Examiner* — Christopher M Afful
(74) *Attorney, Agent, or Firm* — Nelson Mullins Riley & Scarborough LLP

(57) ABSTRACT

A packing device for filling fuel elements with a powder through a fill aperture in an outer shell of the fuel element, including a stationary base, a clamp assembly including a body defining a bore therein, the bore being configured to slidably receive a fuel element therein, wherein the clamp assembly is movable along a vertical axis with respect to the stationary base, a cam assembly including a cam and a drive motor configured to rotate the cam, wherein rotation of the cam alternatingly raises the clamp assembly up along the vertical axis and subsequently drops the clamping assembly, and a powder reservoir assembly including a powder reservoir and a fill needle in fluid communication with the powder reservoir.

12 Claims, 7 Drawing Sheets

(58) Field of Classification Search
CPC .......... G21C 3/623; G21C 3/626; G21C 3/64; G21C 21/04; G21C 3/26
USPC ........................................ 376/260, 261, 264
See application file for complete search history.

(56) References Cited

U.S. PATENT DOCUMENTS

| | | | | | |
|---|---|---|---|---|---|
| 3,372,212 | A | * | 3/1968 | Gayet | C04B 35/653 264/0.5 |
| 3,838,716 | A | * | 10/1974 | Ripple | B65B 1/22 141/12 |
| 3,999,742 | A | | 12/1976 | Heyraud | |
| 4,158,601 | A | * | 6/1979 | Gerkey | G21C 21/04 414/146 |
| 4,235,066 | A | * | 11/1980 | King | G21C 21/02 53/500 |
| 4,489,037 | A | * | 12/1984 | Go | G21C 3/3315 376/261 |
| 4,495,146 | A | * | 1/1985 | Gheri | G21C 21/04 376/261 |
| 4,994,231 | A | * | 2/1991 | Artman | B01F 15/0201 376/261 |
| 5,122,331 | A | * | 6/1992 | Schukei | G21C 21/02 376/261 |
| 5,183,626 | A | * | 2/1993 | Denizou | G21C 7/117 376/327 |
| 5,251,243 | A | * | 10/1993 | Nylund | G21C 3/334 376/261 |
| 6,450,680 | B1 | * | 9/2002 | Bertolotti | B01F 3/18 366/114 |
| 2005/0121563 | A1 | * | 6/2005 | Valentin | B21C 37/06 248/121 |
| 2006/0146974 | A1 | * | 7/2006 | Crawford | G21C 21/04 376/261 |
| 2010/0296621 | A1 | | 11/2010 | Broli et al. | |
| 2012/0090728 | A1 | * | 4/2012 | Duval | G21C 3/623 141/1 |
| 2013/0167972 | A1 | | 7/2013 | Peressoni | |
| 2017/0182724 | A1 | | 6/2017 | Bayle et al. | |
| 2017/0263345 | A1 | | 9/2017 | Venneri et al. | |
| 2018/0025797 | A1 | | 1/2018 | Van Rooyen et al. | |
| 2018/0277270 | A1 | | 9/2018 | Walton et al. | |

\* cited by examiner

NUCLEAR THERMAL PROPULSION FUEL ELEMENT PACKING DEVICE

CLAIM OF PRIORITY

This application claims priority to U.S. provisional patent application No. 62/742,809 filed Oct. 8, 2018, the disclosure of which is incorporated by reference herein.

The invention described herein was made in the performance of work under NASA Contract 80MSFC17C0006 and is subject to the provisions of section 20135 of the National Aeronautics and Space Act (51 U.S.C. § 20135).

TECHNICAL FIELD

The presently disclosed invention relates generally to nuclear reactors and, more specifically, to fuel assemblies for use in constructing nuclear reactor cores and devices and processes for producing those fuel assemblies.

BACKGROUND

Sealed metallic test article vessels containing fuel or surrogate fuel powders are utilized in high-temperature development testing of nuclear propulsion fuel assemblies. It is advantageous to complete all welding processes on the fuel assembly test articles prior to inserting nuclear fuel or surrogate powder into the test articles in order to minimize the impact of the powder on the vessel welds and to maximize the quality of the welds. In the fuel development testing, the characteristics of the powder-filled test articles, such as the mass of the powder and the packing fraction of the powder, should be understood prior to elevated-temperature testing in test facilities. As such, there is a need to precisely control the amount and distribution of fuel or surrogate powder in the test articles although it is not possible to visually observe the volume inside the test articles as they are being filled. Therefore, a test article filling device that enables the control of the noted powder characteristics to the degree necessary is highly desirable.

There at least remains a need, therefore, for fuel assemblies, and processes and devices for producing the same, that are suitable for use in nuclear thermal propulsion assemblies.

SUMMARY OF INVENTION

One embodiment of the present invention provides a packing device for filling fuel elements with a powder through a fill aperture in an outer shell of the fuel element, including a stationary base configured to be received on a support surface, a clamp assembly including a body defining a bore therein, the bore being configured to slidably receive a fuel element therein, and an adjustment member configured to exert force on a corresponding fuel element disposed within the bore of the body, wherein the clamp assembly is movable along a vertical axis with respect to the stationary base. A cam assembly includes a cam and a drive motor configured to rotate the cam, the cam assembly being mounted on the stationary base beneath the clamp assembly so that rotation of the cam alternatingly raises the clamp assembly up along the vertical axis and subsequently drops the clamp assembly. A powder reservoir assembly includes a powder reservoir, a fill needle in fluid communication with the powder reservoir, and a reservoir support that is adjustably secured to the body of the clamp assembly so that the powder reservoir can be adjusted vertically.

Another embodiment of the present invention provides a packing device for filling fuel elements with a powder through a fill aperture in an outer shell of the fuel element, having a stationary base configured to be received on a support surface, a clamp assembly including a body defining a bore therein, the bore being configured to slidably receive a fuel element therein, and an adjustment member configured to exert force on a corresponding fuel element disposed within the bore of the body, wherein the clamp assembly is movable along a vertical axis with respect to the stationary base. A vibratory motor is affixed to the body of the clamp assembly so that the vibratory motor induces vibration of the clamp assembly. A powder reservoir assembly includes a powder reservoir, a fill needle in fluid communication with the powder reservoir, and a reservoir support that is adjustably secured to the body of the clamp assembly so that the powder reservoir can be adjusted vertically.

The accompanying drawings, which are incorporated in and constitute a part of this specification, illustrate one or more embodiments of the invention and, together with the description, serve to explain the principles of the invention.

BRIEF DESCRIPTION OF THE DRAWING

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1A:
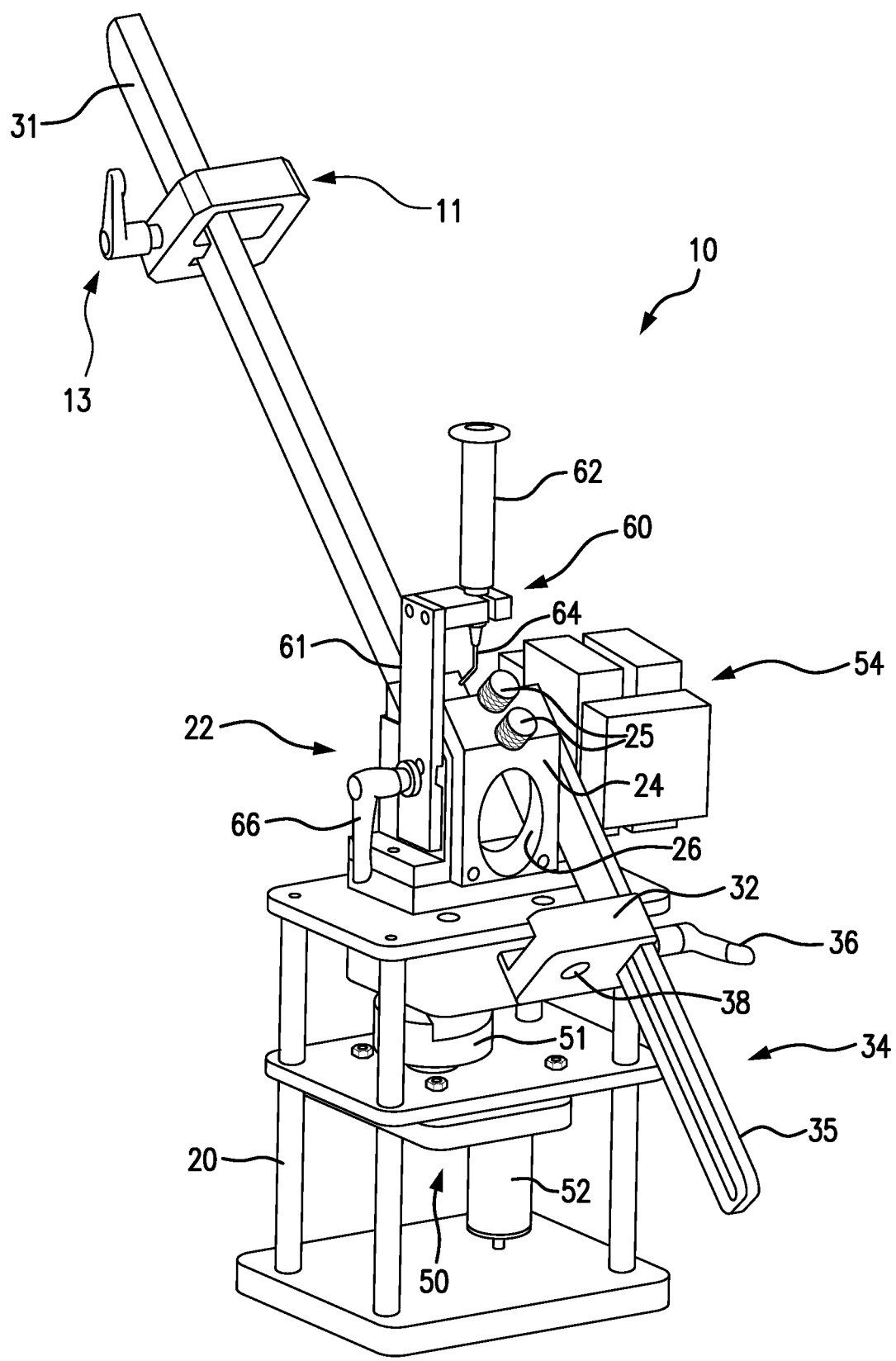
FIGS. 1A, 1B and 1C are perspective views of a nuclear thermal propulsion fuel element packing device constructed in accordance with an embodiment of the present invention.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1B:
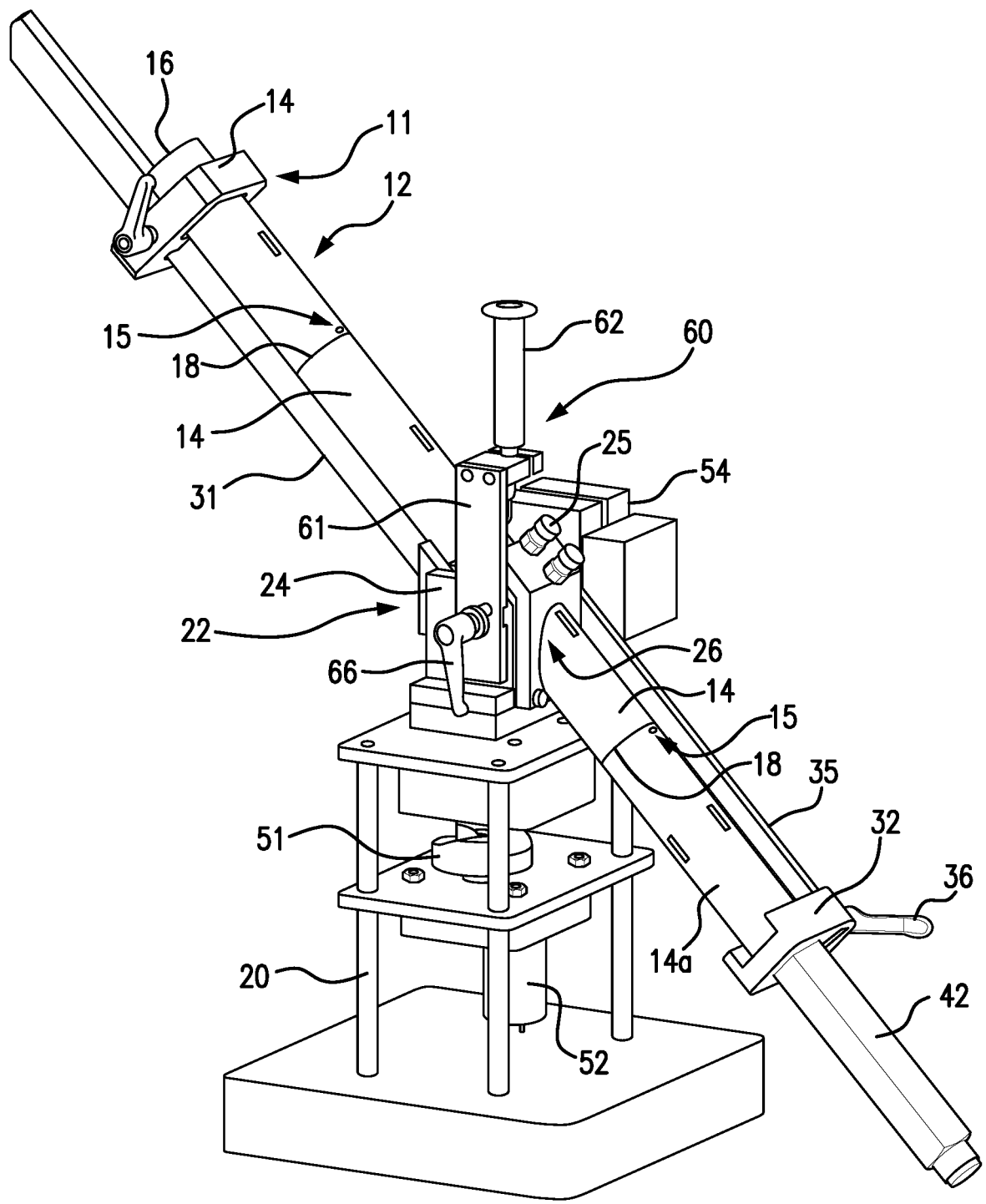
Figure 1C:
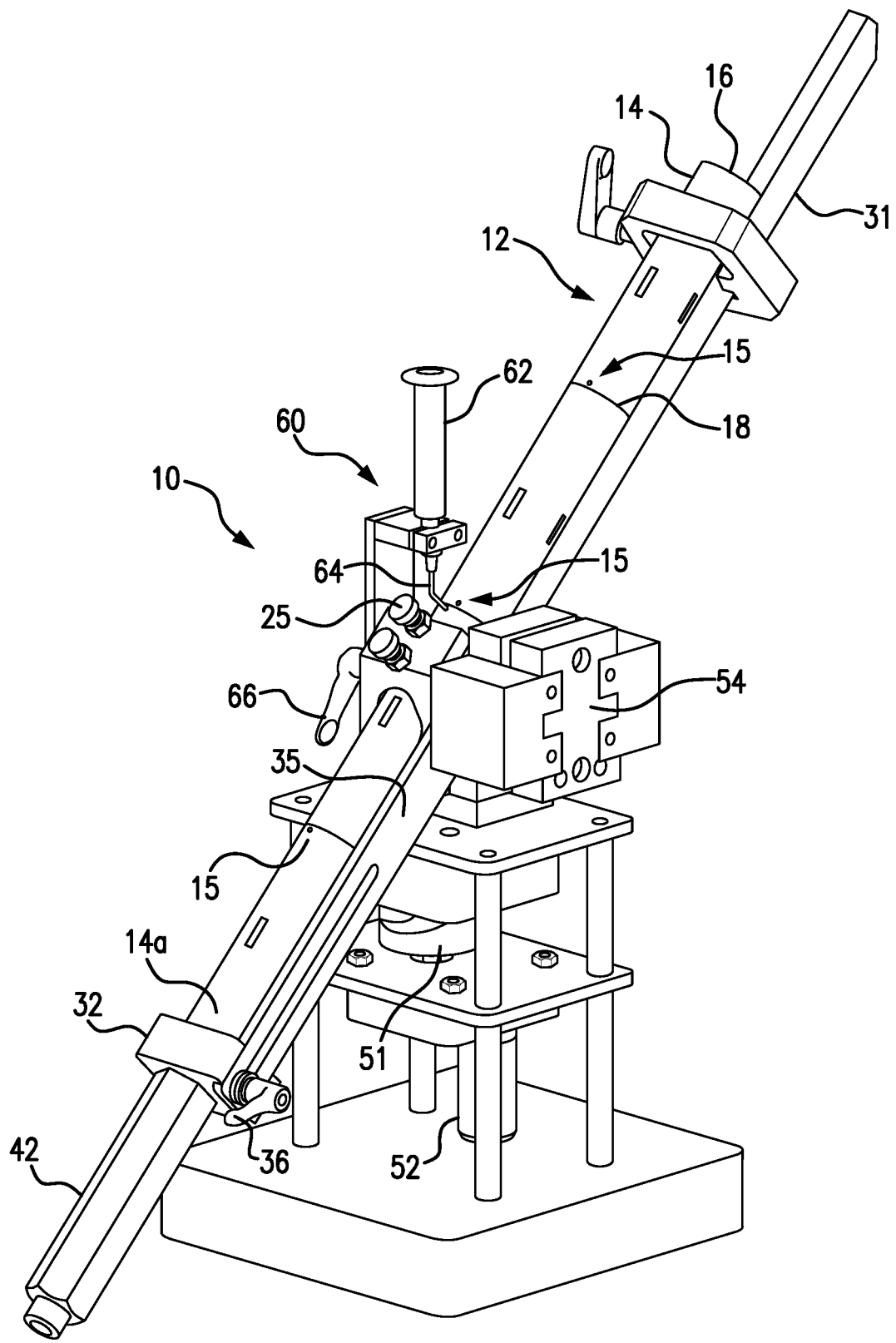

Referring now to the Figures, a nuclear thermal propulsion fuel element packing device 10 in accordance with the present invention includes a stationary base 20, a clamp assembly 22 slidably secured thereto, a fuel element support assembly 31/34, a powder reservoir assembly 60, a cam assembly 50, and an eccentric weight vibratory motor 54, as shown in FIGS. 1A through 1C. As shown, clamp assembly 22 is received on a top surface of stationary base 20 in a manner that allows clamp assembly 22 to be selectively moved along a vertical axis with respect to stationary base 20 over a limited distance. Cam assembly 50 is mounted on stationary base 20 below clamp assembly 22 such that rotation of cam 51 by drive motor 52 results in the raising and dropping motion of clamp assembly 22 with regard to stationary base 20. The frequency with which clamp assembly 22 rises and falls with respect to stationary base can be controlled by alternating the rate at which drive motor 52 rotates cam 51. Eccentric weight vibratory motor 54 is affixed to body 24 of clamp assembly 22 so that vibrations are induced within clamp assembly 22 simultaneously with the up and down motion of the clamp assembly caused by the rotation of cam 51. The alternating raising and dropping motion of clamp assembly and vibrations induced by vibratory motor 54 facilitate filling a corresponding fuel element 12 with surrogate or fuel-bearing powders from powder reservoir assembly 60, as discussed in greater detail below. Note, in alternate embodiments alternate vibration inducing assemblies can be used rather than an eccentric weight vibratory motor.

Still referring to FIGS. 1A through 1C, body 24 of clamp assembly 22 defines a fuel element bore 26 extending therethrough that is configured to receive a shell 14 of a corresponding fuel element 12 during the filling process. The fuel element support assembly is secured to body 24 and includes a support ramp 31 that extends upwardly from body 24 adjacent the bottom perimeter of fuel element bore 26, and a support claim 11 that is slidably received thereon and tightened and loosed by handle 13. As well, the support assembly includes a slide assembly 34 that includes a stop plate 32 that is slidably received on slide arm 35 and is securable thereto in the desired position by way of a clamp 36. As shown, both ramp 31 and slide assembly 34 extend outwardly from body 24 of clamp assembly 22 at an angle equal to the angle defined by an intersection of a longitudinal center axis of fuel element bore 26 and a vertical axis. Powder reservoir assembly 60 includes a reservoir support 61 extending upwardly from body 24 that is adjustably secured thereto by a clamp 66. Powder reservoir 62 is supported by reservoir support 61 and includes a fill needle 64 extending downwardly therefrom.

As best seen in FIGS. 1B and 1C, during a fuel packing operation, a plurality of fuel element shells 14 is slidably received within fuel element bore 26 of clamp assembly 22. In the embodiment shown, four fuel element shells 14 are affixed to each other by a series of welds 18. Each fuel element also includes a pair of end caps 16 that are secured to the respective shell 14 by welds, and a fill aperture 15 formed in a side wall of the shell. As shown, one of the outer fuel element shells 14a is received adjacent stop plate 32 and the adjustment of stop plate 32 along slide arm 34 is used to position a fill aperture 15 of one of the other shells 14 adjacent the bottom end of fill needle 64. The fuel element shells 14 are further secured by support clamp 11, through which they pass. Fine adjustment of fill aperture 15 with regard to fill needle 64 can be adjusted by way of a set screw 40 (FIG. 2) that is received in a threaded through bore 38 that is formed in stop plate 32. After the fuel element shell 14 being filled is secured in the desired position using clamp elements 25, set screw 40 can be removed and a counterweight 42 can be secured to the threaded through bore 38 of stop plate 32 to help balance the clamp assembly 22 and fuel element shells 14 during the filling operation.

Figure 2:
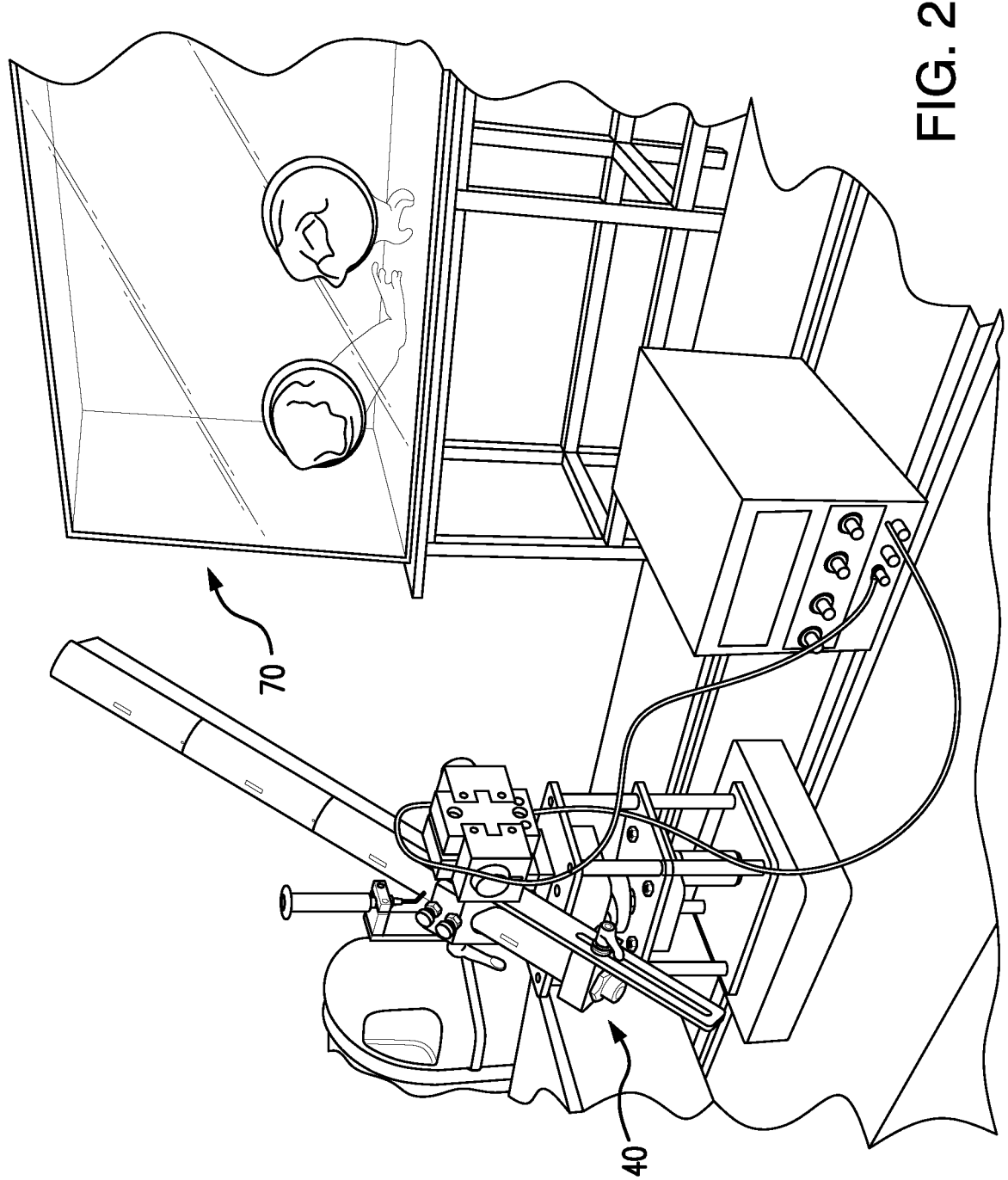
FIG. 2 is a perspective view of the thermal propulsion fuel element packing device shown in FIG. 1 next to a containment box in which fuel element packing may occur.
Figure 3A:
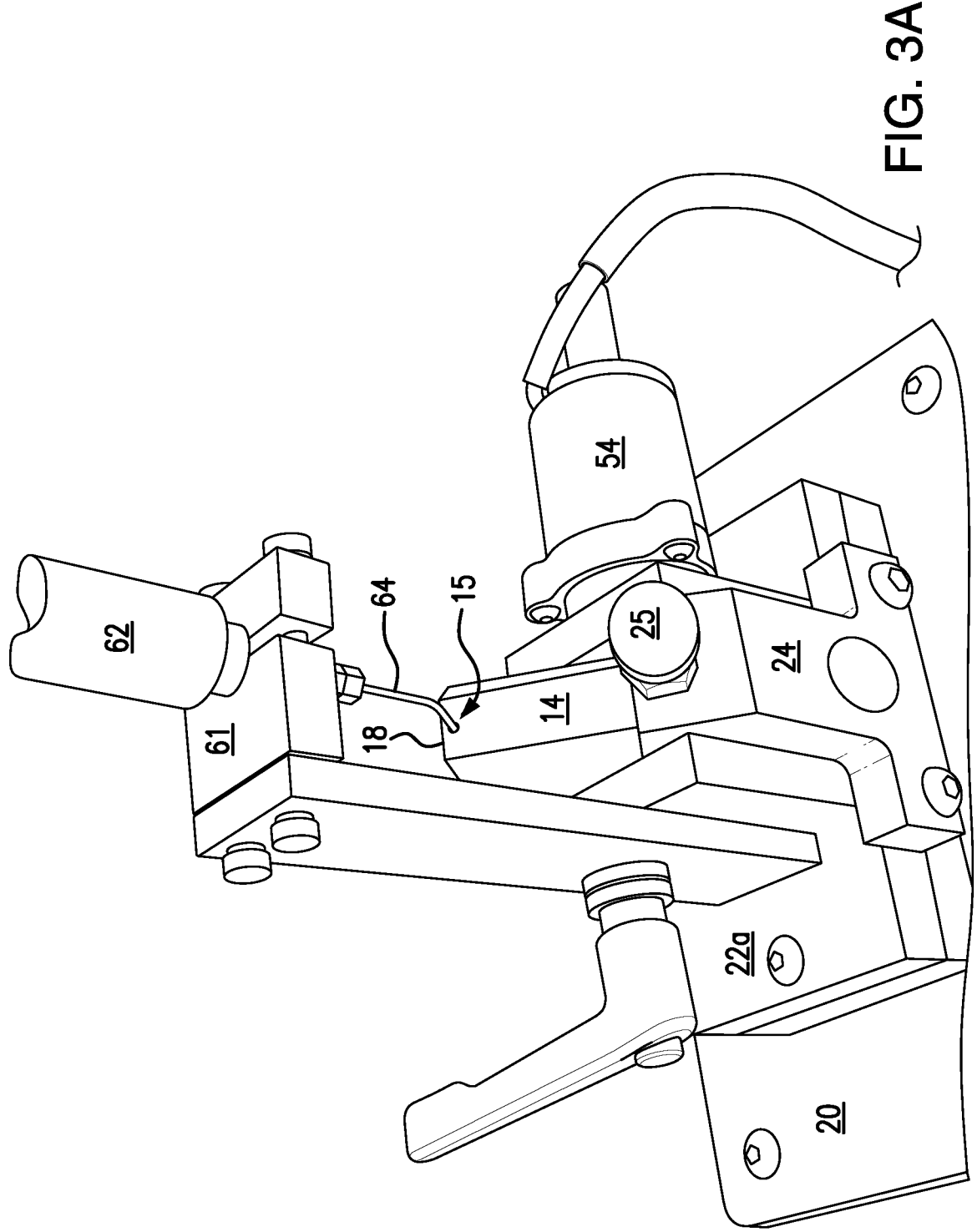
FIGS. 3A, 3B and 3C are perspective views of an alternate embodiment of a thermal propulsion fuel element packing device in accordance with the present invention.
Figure 3B:
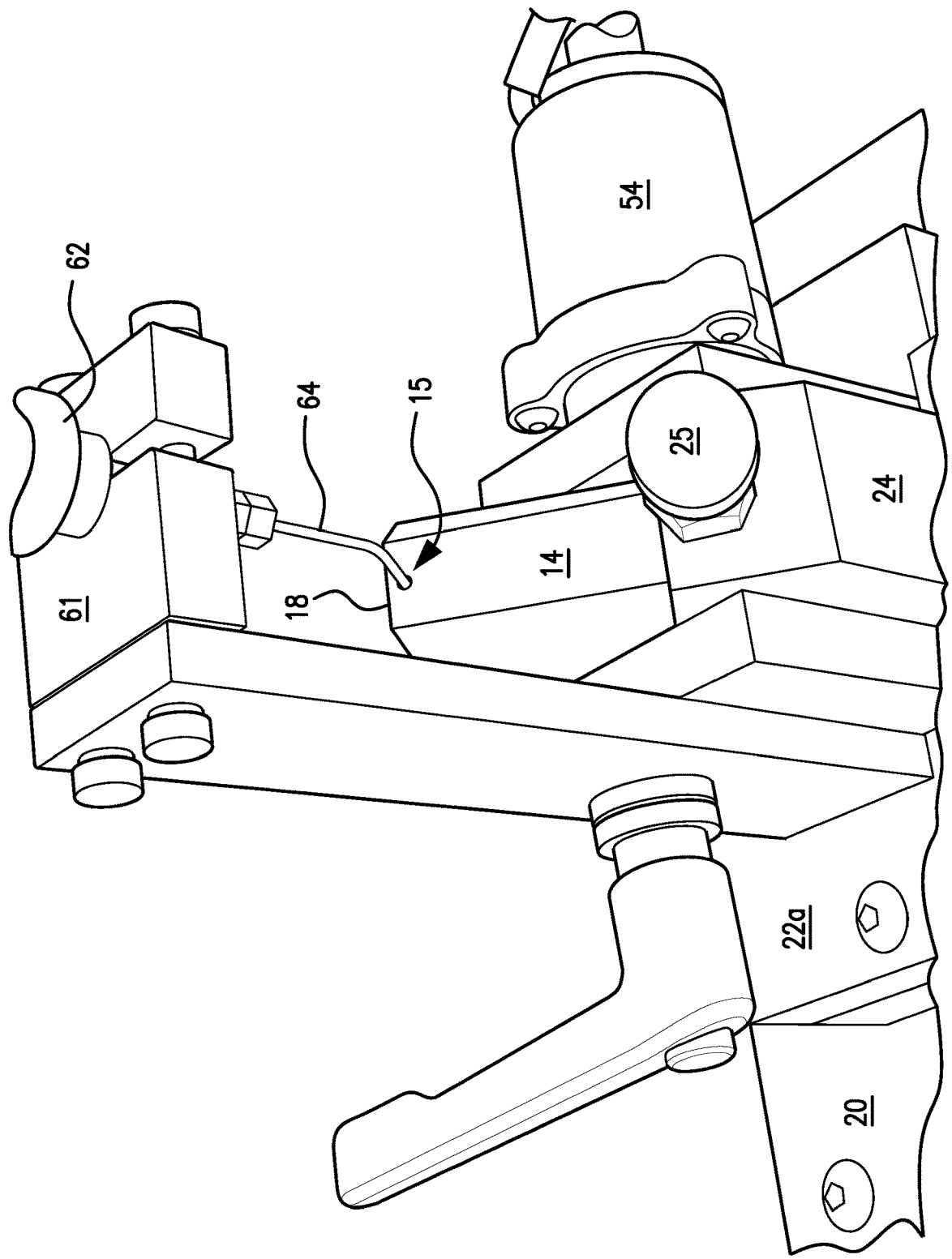
Figure 3C:
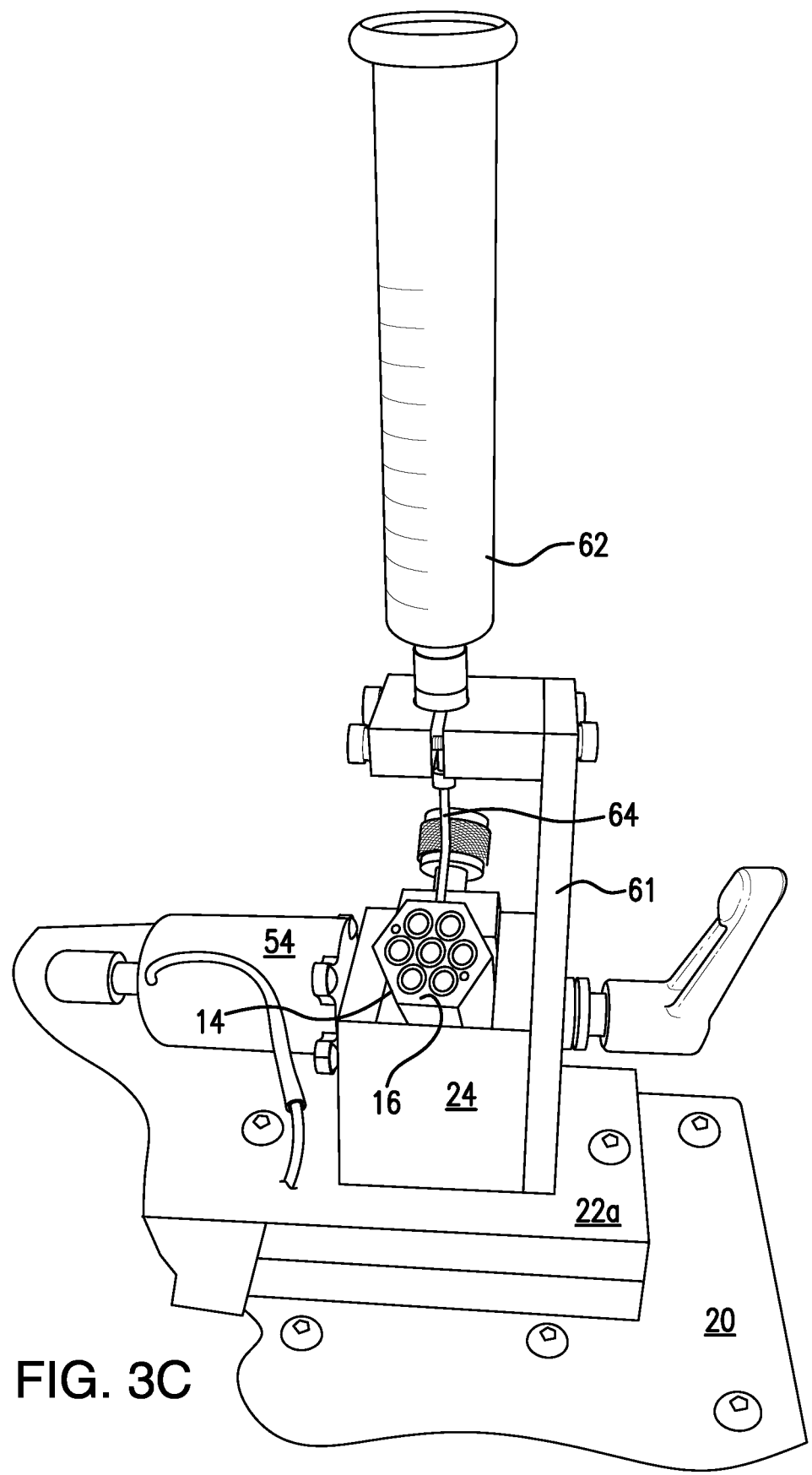

Additionally, the position of fill needle 64 with regard to fill aperture 15 may be adjusted by loosening clamp 66 of the powder reservoir assembly 60 so that the reservoir support 61 may be adjusted. As noted above, clamp elements 25 (i.e., threaded stems) that extend inwardly into fuel element bore 26 are used to secure the corresponding fuel element 12 with respect to the body 24 of clamp assembly 22 once the desired position of fill needle 64 with respect to fill aperture 15 is achieved. As surrogate or fuel-bearing powder is flowed from powder reservoir 62 through fill needle 64 into fuel element shell 14, cam 51 is rotated at the desired rate and vibratory motor 54 includes vibrations within clamp assembly 22 to help ensure that the powder flows in a continual manner and settles within the shell. Note, packing device 10 is preferably sized so that it may be disposed within a standard sized radiological containment 70, as shown in FIG. 2, during fuel packing operations. As well, as shown in FIGS. 3A through 3C, alternate embodiments of clamp assemblies 22a may be used with the remaining components of packing device 10 as needed for fuel packing operations on variously sized embodiments of fuel assemblies.

These and other modifications and variations to the invention may be practiced by those of ordinary skill in the art without departing from the spirit and scope of the invention, which is more particularly set forth in the appended claims. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A packing device for filling fuel elements with a powder through a fill aperture in an outer shell of the fuel element, comprising:
   a stationary base configured to be received on a support surface;
   a clamp assembly including a body defining a bore therein, the bore being configured to slidably receive a fuel element therein, and an adjustment member configured to exert force on a corresponding fuel element disposed within the bore of the body, wherein the clamp assembly is movable along a vertical axis with respect to the stationary base;
   a cam assembly including a cam and a drive motor configured to rotate the cam, wherein the cam assembly is mounted on the stationary base beneath the clamp assembly so that rotation of the cam alternatingly raises the clamp assembly up along the vertical axis and subsequently drops the clamp assembly; and
   a powder reservoir assembly including a powder reservoir, a fill needle in fluid communication with the powder reservoir, and a reservoir support that is adjustably secured to the body of the clamp assembly so that the powder reservoir can be adjusted vertically.

2. The packing device of claim 1, further comprising a vibratory motor affixed to the body of the clamp assembly so that the vibratory motor induces vibration of the clamp assembly.

3. The packing device of claim 2, wherein the bore in the body of the clamp assembly is at an angle with respect to the vertical axis.

4. The packing device of claim 3, wherein the bore is a blind bore.

5. The packing device of claim 3, wherein the bore is a through bore and the packing device further comprises a support ramp extending both upwardly and outwardly from beneath an upper end of the bore, wherein the support ramp is at the same angle with the vertical axis as is the bore.

6. The packing device of claim 5, wherein the packing device further comprises a slide assembly extending both downwardly and outwardly from beneath a lower end of the bore, the slide assembly including a slide arm and a stop plate that is movable along the slide arm and is configured to receive a bottom end of the corresponding fuel element, wherein the slide assembly is at the same angle with the vertical axis as is the bore.

7. A packing device for filling fuel elements with a powder through a fill aperture in an outer shell of the fuel element, comprising:
- a stationary base configured to be received on a support surface;
- a clamp assembly including a body defining a bore therein, the bore being configured to slidably receive a fuel element therein, and an adjustment member configured to exert force on a corresponding fuel element disposed within the bore of the body, wherein the clamp assembly is movable along a vertical axis with respect to the stationary base;
- a vibratory motor affixed to the body of the clamp assembly so that the vibratory motor induces vibration of the clamp assembly; and
- a powder reservoir assembly including a powder reservoir, a fill needle in fluid communication with the powder reservoir, and a reservoir support that is adjustably secured to the body of the clamp assembly so that the powder reservoir can be adjusted vertically.

8. The packing device of claim 7, further comprising a cam assembly including a cam and a drive motor configured to rotate the cam, wherein the cam assembly is mounted on the stationary base beneath the clamp assembly so that rotation of the cam alternatingly raises the clamp assembly up along the vertical axis and subsequently drops the clamp assembly.

9. The packing device of claim 7, wherein the bore in the body of the clamp assembly is at an angle with respect to the vertical axis.

10. The packing device of claim 9, wherein the bore is a blind bore.

11. The packing device of claim 9, wherein the bore is a through bore and the packing device further comprises a support ramp extending both upwardly and outwardly from beneath an upper end of the bore, wherein the support ramp is at the same angle with the vertical axis as is the bore.

12. The packing device of claim 11, wherein the packing device further comprises a slide assembly extending both downwardly and outwardly from beneath a lower end of the bore, the slide assembly including a slide arm and a stop plate that is movable along the slide arm and is configured to receive a bottom end of the corresponding fuel element, wherein the slide assembly is at the same angle with the vertical axis as is the bore.

\* \* \* \* \*

UNITED STATES PATENT AND TRADEMARK OFFICE
CERTIFICATE OF CORRECTION

PATENT NO. : 11,127,508 B2
APPLICATION NO. : 16/594530
DATED : September 21, 2021
INVENTOR(S) : Russell L. Lake et al.

Page 1 of 1

It is certified that error appears in the above-identified patent and that said Letters Patent is hereby corrected as shown below:

In the Specification

Column 1, Line 13 replace the second paragraph with the following heading and paragraph:
--GOVERNMENT SUPPORT CLAUSE
The invention described herein was made in the performance of work under NASA Contract 80MSFC17C0006 and is subject to the provisions of section 20135 of the National Aeronautics and Space Act (51 U.S.C. § 20135). The government has certain rights in the invention.--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*